United States Patent
Peickert

(10) Patent No.: US 7,233,317 B2
(45) Date of Patent: Jun. 19, 2007

(54) COMPUTER PROGRAM OPERATION INTERFACE

(76) Inventor: Stanley Alden Peickert, 3400 - 160th Ave. Southeast, Portland, OR (US) 97236

( * ) Notice: Subject to any disclaimer, the term of this patent is extended or adjusted under 35 U.S.C. 154(b) by 278 days.

(21) Appl. No.: 10/624,969

(22) Filed: Jul. 23, 2003

(65) Prior Publication Data

US 2005/0017945 A1    Jan. 27, 2005

(51) Int. Cl.
*G09G 5/08* (2006.01)

(52) U.S. Cl. ...................... 345/157; 345/163
(58) Field of Classification Search ........ 345/156–167; D14/402–410
See application file for complete search history.

(56) References Cited

U.S. PATENT DOCUMENTS

| 5,648,798 | A * | 7/1997 | Hamling ..................... 345/163 |
| 6,590,564 | B1 * | 7/2003 | McLoone et al. ........... 345/167 |
| 6,828,958 | B2 * | 12/2004 | Davenport .................. 345/163 |
| 2002/0105500 | A1* | 8/2002 | Edwards et al. ............ 345/163 |
| 2002/0118174 | A1* | 8/2002 | Rodgers ..................... 345/163 |
| 2005/0174331 | A1* | 8/2005 | Vayda ........................ 345/167 |

* cited by examiner

*Primary Examiner*—Amr A. Awad
*Assistant Examiner*—Stephen Sherman

(57) ABSTRACT

This single handed Computer Program Operation Interface is shaped to fit comfortably into the palm of a relaxed hand in the natural position allowing the hand to function with no stress on the muscles and tendons of the metacarpal area thus dramatically reducing the possibility of debilitating injury to the operator. Since the palm and wrist stabilize and manipulate the device, all five digits are free to perform independent and simultaneous input functions significantly increasing the speed and productivity of the operator.

9 Claims, 3 Drawing Sheets

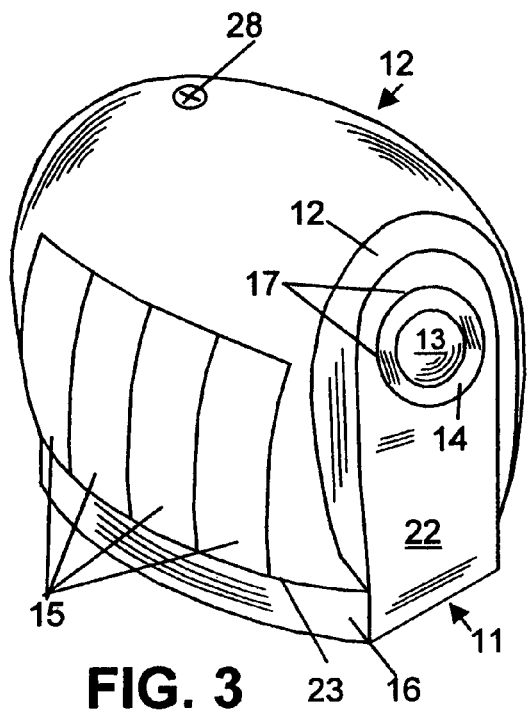
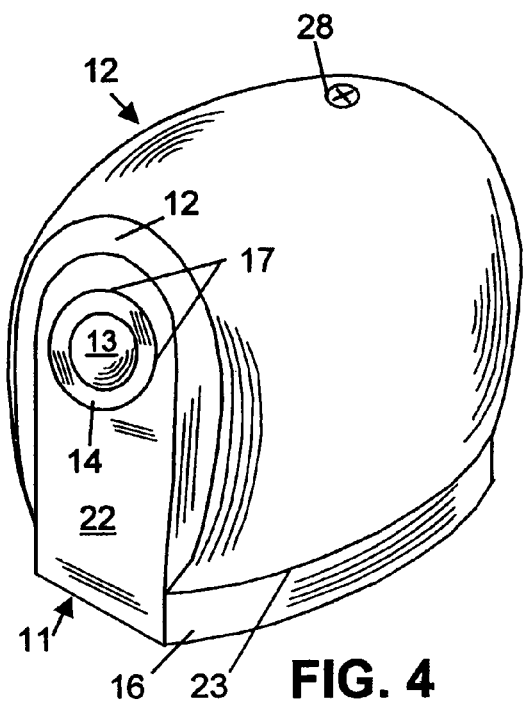
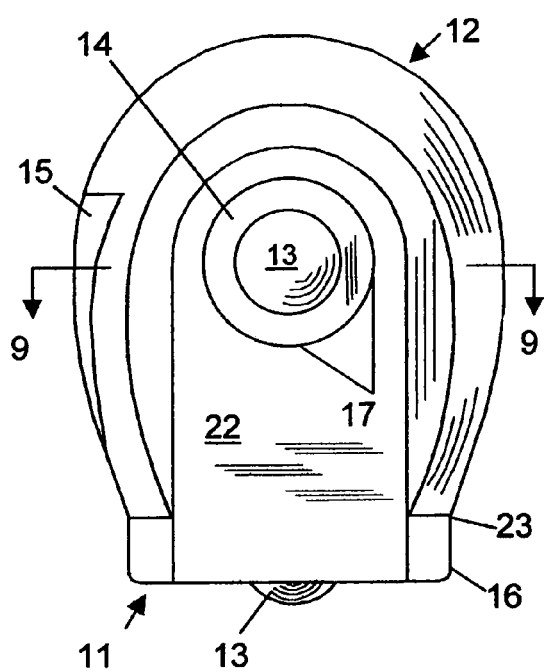
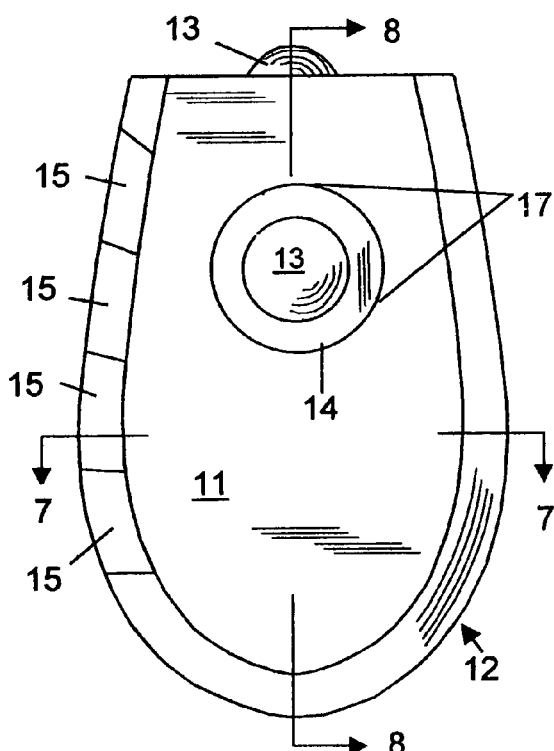

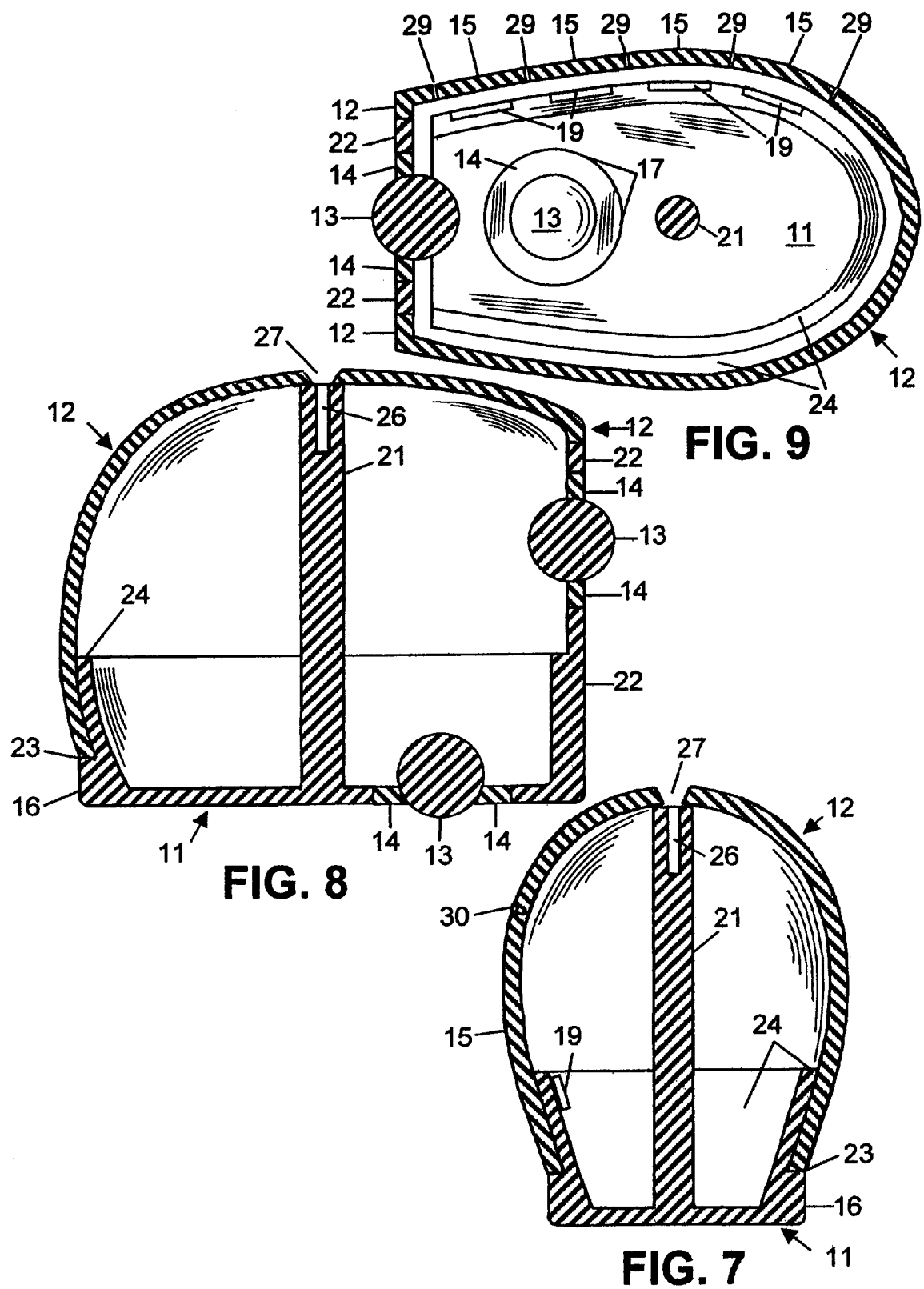

COMPUTER PROGRAM OPERATION INTERFACE

BACKGROUND OF THE INVENTION

This invention relates to a Computer Program Operation Interface which allows the free and independent use of all five digits of the hand and is anatomically friendly to the user, minimizing functional damage caused by continual repetitive use of the hand in an unnatural position.

In view of the fact that numerous debilitating injuries occur to computer operators from repeated strain on the muscles and tendons of the hand, this invention has a unique shape which allows the hand to function in a natural, relaxed position while in use dramatically reducing the possibility of physical injury such as carpal tunnel syndrome. In view of the fact that all such devices currently available require the thumb and baby finger to stabilize and manipulate while the fingers are extended in an unnatural position, this invention was designed to require only the palm and wrist to stabilize and manipulate the device leaving all five digits free to perform operational functions.

Because physical injury to workers caused by continual unnatural use of the hand is devastating to business, both financially and in terms of available manpower, and because computer programs are becoming ever more complex begging more flexible input devices, this invention is conceived to address these needs and make what is old obsolete.

SUMMARY OF THE INVENTION

According to the present invention and forming a primary objective thereof, a uniquely designed Computer Program Operation Interface is herein described which is attractive in the workplace, which allows the computer program operator's hand to function in a natural relaxed position, and which provides expanded functionality and speed for advanced software programs.

One objective of the invention is accomplished by a uniquely shaped body which fits comfortably into the palm of the operator's relaxed hand allowing it to function in a natural position relieving excess tension on the muscles and tendons of the hand and arm. This anatomically friendly shape will dramatically reduce injury to workers saving employers millions of dollars in medical expenses, damage awards, and lost worker time. The exact shape of the body of the device is to be determined by consulting with plastic surgeons, orthopedic doctors, and experts in the field of carpal tunnel syndrome.

Another objective of the invention is accomplished because the device fits comfortably into the palm of the relaxed hand allowing it to be stabilized and manipulated by only slight movements of the wrist thus freeing all five digits to perform individual program functions. Four industry standard on/off microswitches are operated by four individual finger pads and two X-Y rollerball sensors are included, one operated by the thumb and one by the movement of the wrist. These six switches allow optimum use of the operator's hand.

The preferred embodiments of this invention are all contained in two separate components: the molded base and the molded plastic covering shell. The on/off microswitches and the X-Y axis rollerball sensors with the interior wiring harness discussed herein are all industry standard components compatible with the objectives of this invention.

The invention will be better understood and the advantages will be apparent from the following descriptions presented in conjunction with the accompanying drawings.

BRIEF DESCRIPTION OF THE DRAWINGS

FIG. 1 is a straight on front view of the assembled invention embodying principles of the invention.

FIG. 2 is a bottom view of the assembled invention embodying principles of the invention.

FIG. 3 is a top left perspective view of the assembled invention embodying principles of the invention.

FIG. 4 is a top right perspective view of the assembled invention embodying principles of the invention.

FIG. 7 is a sectional view on line 7—7 of FIG. 2 of the assembled invention, a vertical section across the length, embodying principles of the invention.

FIG. 8 is a sectional view on line 8—8 of FIG. 2 of the assembled invention, a vertical section along the length, embodying principles of the invention.

FIG. 9 is a sectional view on line 9—9 of FIG. 1 of the assembled invention, a horizontal section along the length, embodying principles of the invention.

DETAILED DESCRIPTION OF PREFERRED EMBODIMENTS

Figure 6:
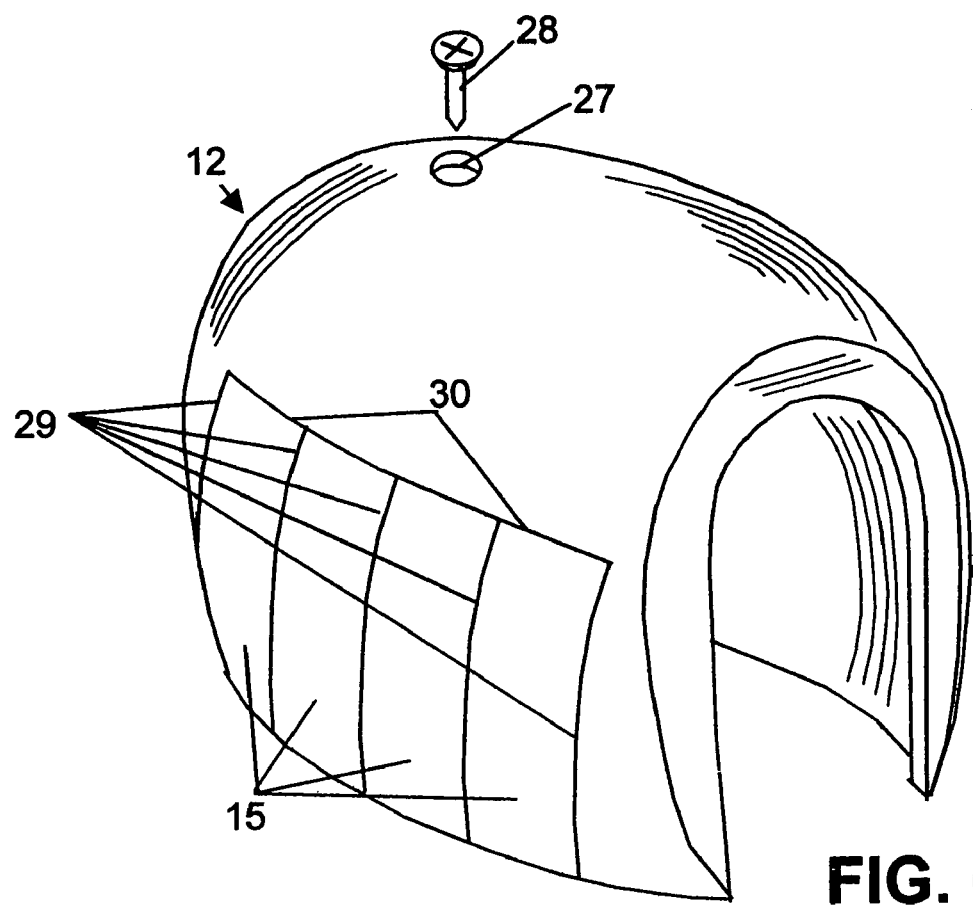
FIG. 6 is a top left perspective view of the molded covering shell only, separated from the base, embodying principles of the invention.

With particular reference to the drawings and first to the embodiments in FIGS. 1–4, the invention consists of a molded plastic base (11) and molded plastic covering shell (12). Into the base (11) are installed four on/off microswitches (not shown) which are located directly under and operated by four finger pads (15) molded into the left side of the covering shell (12). There are also installed into the base (11) two industry standard X-Y axis rollerball sensors (17), one is in the floor of the base (11) and one in the vertical tab (22) extending up from the floor of the base (11). These six switches are appropriately wired into an industry standard wiring harness and serial patch cord (not shown). The covering shell (12) and base (11) are molded of high impact plastic and are shaped to fit comfortably into the palm of the relaxed hand. The covering shell (12) fits snugly onto the base (11) resting on the stepledge (23) which is located along the top edge of the base apron (16) and around the vertical tab (22). When installed, the covering shell (12) is held in place by the assembly screw (28). The rollerball (13) of the X-Y axis rollerball sensor (17) is held in place by the snap-lock retainer ring (14).

FIGS. 1 and 2 illustrate the assembled invention showing the covering shell (12) "bulging out" around the middle making it larger than the perimeter of the base (11) to fit more comfortably into the operator's hand. The actual physical shape and size of the body of this device will be determined by consulting with anatomical experts.

Figure 5:
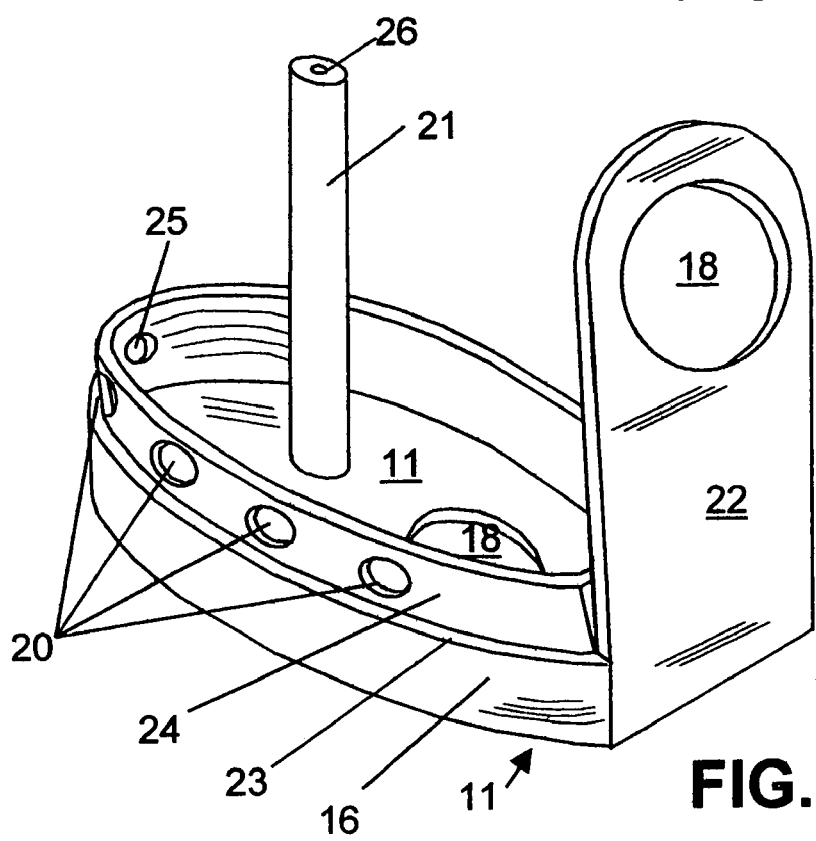
FIG. 5 is a top left perspective of the molded base only separated from the covering shell, embodying principles of the invention.

FIG. 5 is a top left perspective view of the base (11), separated from the covering shell (12), with its embodiments but without the electronic parts installed. It features the base apron (16) around which is a stepledge (23) onto which the covering shell (12) rests when installed. The figure illustrates the vertical tab (22) containing an orifice (18) of the proper size and with the proper appurtenances to receive an industry standard X-Y axis rollerball sensor (not shown). A similar orifice is provided in the floor of the base (11).

FIG. 5 also illustrates an interior shortwall (24) just inside the stepledge (23) which extends around the perimeter of the base (11) and behind the vertical tab (22) containing four receptors (20) of the proper size and with the proper appurtenances to receive an industry standard on/off microswitch (19—not shown) and a U shaped slot at the rear (25) to allow exit of an industry standard serial patch cord (not shown). The four receptors (20) are located directly under the finger pads (15) molded into the appropriate side of the covering shell (12). The base pillar (21) rises up from the floor of the base (11) and contains a threaded hole (26) in the top to receive the assembling screw (28) which anchors the covering shell when installed on the base.

FIG. 6 is a top left perspective view of the molded covering shell (12) separated from the base (11) with its embodiments. It is molded of high impact plastic to the exact size and shape determined by consulting with experts in the anatomy of the hand. The bottom edge of the covering shell (12) conforms to the exact size and shape of the stepledge (23) and vertical tab (22) onto which it rests when installed. The covering shell (12) contains a screw hole in the top (27) that aligns with the threaded hole (26) in the top of the base pillar (21) through which the assembling screw (28) is installed. Four finger pads (15) are molded into the appropriate side of the covering shell (12) so that all of the material is removed from the vertical lines of separation (29) completely separating the finger pads (15). Only part of the material is omitted from the horizontal line of separation (30) above the finger pads (15) leaving a plastic hinge at the top of each finger pad (15) and leaving them attached to the covering shell (12). A U shaped slot (not shown) at the bottom rear of the covering shell (12) to fit over the serial patch cord which exits from the base (11) through the slot (25) in the back of the shortwall (24).

FIG. 7 is a sectional view across the length of the assembled invention on line 7—7 of FIG. 2. It illustrates the installed covering shell (12), The Base (11), the threaded hole (26) in the base pillar (12), an on/off microswitch (19) installed on the shortwall (24), the screw hole (27) in the top of the covering shell (12), the base apron (16), the stepledge (23), the horizontal line of separation (30) along the top of the finger pads (15) as located on the left side of the covering shell (12) with only part of the material being omitted leaving the finger pads (15) attached to the covering shell (12) by a plastic hinge at the top of each finger pad (15).

FIG. 8 is a sectional view vertically along the length of the assembled invention on line 8—8 of FIG. 2. It illustrates the base (11), the installed covering shell (12) with the screw hole (27) at the top, the threaded hole (26) in the top of the base pillar (21), the base apron (16), the stepledge (23), the shortwall (24), the vertical tab (22) into which a rollerball (13) and a snap-lock retainer ring (14) are installed, and the rollerball (13) and snap-lock retainer ring (14) in place on the floor of the base (11).

FIG. 9 is a sectional view horizontally along the length of the assembled invention on line 9—9 of FIG. 1. It illustrates the base (11), the installed covering shell (12), the vertical line of separation (29) between the finger pads (15), the shortwall (24) onto which four industry standard on/off microswitches (19) are installed, the base pillar (21), the rollerball (13) and snap-lock ring (14) in place on the floor of the base (11), the vertical tab (22) with the rollerball (13) and the snap-lock ring (14) in place.

It is understood that the forms of my invention herein shown and described are to be taken as preferred embodiments of the same and that various changes is size, shape, or arrangement of parts such as moving the finger pads and on/off microswitches from one side to the other to make right and left hand models may be resorted to without detracting from the spirit of the invention or of the scope of the subjoined claims. The industry standard switches, sensors, and interior wiring included in these descriptions are not part of this patent but are necessary inclusions to fully describe the objectives and preferred embodiments of the invention. The molded base (11) and molded covering shell (12) are the sole and complete components of this invention and all of the objectives and principle embodiments of the same are contained therein.

Having thus described my invention I claim:

1. A Computer Program Operation Interface arranged to provide optimum use of the operator's hand while allowing the hand to function in a relaxed natural position comprising:
    (a) a molded plastic base portion with a horizontal oval-shaped deck designed to interface with a horizontal work surface,
    (b) said base having a vertical tab rising perpendicularly from one end of the horizontal oval-shaped deck and a vertical shortwall rising around its perimeter slightly inset from the outside edge of the horizontal deck,
    (c) said base having a vertical pillar rising perpendicularly from the approximate center of the horizontal deck with a threaded hole in the top of the vertical pillar, and
    (d) a molded plastic covering shell generally egg-shaped configured to fit over the base portion with a U-shaped slot in one end to fit over the vertical tab and a hole in its top aligned over the threaded hole in the vertical pillar,
    (e) said covering shell having four (4) finger pads molded into one side or the other completely separated vertically but hinged at the top,
    (f) Said covering shell being attached to said base portion by means of an assembling screw installed through the hole in the top of the covering shell and threaded into the hole on the top of the vertical base pillar.

2. The Computer Program Operation Interface of claim 1 including an actuator comprised of an X-Y axis rollerball sensor installed in the oval-shaped deck of the base portion located between the vertical tab and the vertical pillar with a portion of the rollerball extending below the bottom surface to be manipulated by moving the base across a horizontal work surface communicating with the computer program via a serial patch cord or a lazar sender.

3. The Computer Program Operation Interface of claim 1 including an actuator comprised of an X-Y axis rollerball sensor installed in the top of the vertical tab with a portion of the rollerball extending past the surface of the vertical tab to be manipulated by the thumb of the operator communicating with the computer program via a serial patch cord or lazar sender.

4. The Computer Program Operation Interface of claim 1 including four (4) actuators comprised of four (4) on/off microswitches installed on one side or the other of the vertical shortwall positioned directly under and actuated by the four (4) finger pads molded into one side or the other of the covering shell to be manipulated independently by the four (4) fingers of the operator's hand communicating with the computer program via a serial patch cord or lazar sender.

5. A Computer Program Operation Interface arranged to provide optimum use of the operator's hand while allowing the hand to function in a relaxed natural position comprising:
  (a) a molded plastic base portion with a horizontal oval-shaped deck designed to interface with a horizontal work surface,
  (b) said base having a vertical tab rising perpendicularly from one end or the horizontal oval-shaped deck and a vertical shortwall rising around its perimeter slightly inset from the outer edge of the horizontal deck,
  (c) said base having a vertical pillar rising perpendicularly from the approximate center of the horizontal deck with a threaded hole in the top of the vertical pillar, and
  (d) a molded plastic covering shell generally egg-shaped configured to fit over the base portion with a U-shaped slot in one end to fit over the vertical tab and a hole in its top aligned over the threaded hole in the vertical pillar,
  (e) said covering shell having four (4) finger pads molded into one side or the other completely separated vertically but hinged at the top,
  (f) said covering shell attached to the base portion by means of an assembling screw installed through the hole in the top of the covering shell and threaded into the hole on the top of the vertical base pillar,
  (g) said assembled base portion and covering shell having installed in the assembled device a first actuator X-Y axis rollerball sensor installed in the horizontal oval-shaped deck of the base portion, a second actuator X-Y rollerball sensor installed in the top of the vertical tab, and a third, fourth, fifth, and sixth actuator on/off microswitch installed in one side or the other of the vertical shortwall located directly under the four (4) finger pads molded into one side or the other of the covering shell all six (6) of said actuators communicating with the computer program via a serial patch cord or lazar sender.

6. The Computer Program Operation Interface of claim 5 comprising an assembled device accompanied by a programmable software driver allowing the operator to program each actuator switch to interact with the desired software program function.

7. The Computer Program Operation Interface of claim 5 comprising an assembled device which allows the first actuator to be manipulated by horizontal movement of the operator's wrist moving the device over the horizontal work surface, the second actuator to be manipulated by the rotary action of the operator's thumb, and the third, fourth, fifth, and sixth actuators to be manipulated by the independent action of each of the operator's four (4) fingers permitting independent and simultaneous use of all six (6) actuators.

8. The Computer Program Operation Interface of claim 5 comprised of an assembled device with a molded plastic covering shell generally egg-shaped configured to fit into the palm cavity of a relaxed hand in the natural position supporting all the inner surfaces of the palm and fingers with the weight of the hand entirely supported in the metacarpal-philangeal region of the palm.

9. The Computer Program Operation Interface of claim 5 comprising an assembled device with a molded plastic covering shell generally egg-shaped configured to fit into the palm cavity of a relaxed hand in the natural position allowing the operator to perform program functions without extending the fingers thus eliminating unnatural strain on the tendons and metacarpal-philangeal region of the hand reducing a common cause of carpal tunnel syndrome.

* * * * *